(12) United States Patent  
Jang et al.

(10) Patent No.: US 8,476,797 B2
(45) Date of Patent: Jul. 2, 2013

(54) MAGNETIC BEARING DEVICE FOR SUPPORTING ROLL SHAFT

(75) Inventors: Tae-In Jang, Gwangyang (KR); Chang-Woon Jee, Gwangyang (KR); Yong-Hun Kweon, Gwangyang (KR); Gun-Young Kim, Gwangyang (KR)

(73) Assignee: Posco, Pohang (KR)

( * ) Notice: Subject to any disclaimer, the term of this patent is extended or adjusted under 35 U.S.C. 154(b) by 364 days.

(21) Appl. No.: 12/920,691

(22) PCT Filed: May 6, 2010

(86) PCT No.: PCT/KR2010/002872
§ 371 (c)(1),
(2), (4) Date: Sep. 2, 2010

(87) PCT Pub. No.: WO2010/128804
PCT Pub. Date: Nov. 11, 2010

(65) Prior Publication Data
US 2011/0050016 A1 Mar. 3, 2011

(30) Foreign Application Priority Data
May 6, 2009 (KR) ........................ 10-2009-0039092

(51) Int. Cl.
*H02K 7/09* (2006.01)
(52) U.S. Cl.
USPC ....................................... 310/90.5

(58) Field of Classification Search
USPC ........................................................ 310/90.5
See application file for complete search history.

(56) References Cited

U.S. PATENT DOCUMENTS

| | | | |
|---|---|---|---|
| 5,262,812 A | 11/1993 | Fukasawa | |
| 5,939,813 A * | 8/1999 | Schob | 310/425 |
| 6,359,356 B1 * | 3/2002 | Hayashi | 310/90.5 |
| 6,841,908 B2 | 1/2005 | Hasegawa et al. | |
| 7,800,268 B2 | 9/2010 | Sun et al. | |
| 2003/0075105 A1 * | 4/2003 | Plaetzer | 118/423 |
| 2004/0150278 A1 | 8/2004 | Okada et al. | |
| 2009/0174270 A1 * | 7/2009 | Denk et al. | 310/90.5 |

FOREIGN PATENT DOCUMENTS

| | | |
|---|---|---|
| JP | 6455031 A | 3/1989 |
| JP | 04296218 A | 10/1992 |
| JP | 04346641 A | 12/1992 |
| JP | 205260 A | 7/2000 |
| JP | 2005532516 A | 10/2005 |
| KR | 10 0373006 A | 2/2003 |
| KR | 10 2005 0110506 A | 11/2005 |

* cited by examiner

*Primary Examiner* — Tran Nguyen
*Assistant Examiner* — David Scheuermann
(74) *Attorney, Agent, or Firm* — The Webb Law Firm

(57) ABSTRACT

A magnetic bearing device includes a magnet generating a magnetic field at a protrusion formed toward a roll shaft, and a body portion supporting the magnet in one direction. The roll shaft is supported while an air gap is formed between the roll shaft and the protrusion, and both sides of the protrusion are rounded.

15 Claims, 8 Drawing Sheets

Prior Art

MAGNETIC BEARING DEVICE FOR SUPPORTING ROLL SHAFT

TECHNICAL FIELD

The present invention relates to a magnetic bearing device for supporting a roll shaft, and more particularly, to a magnetic bearing device which supports a roll shaft in a non-contact manner, using a permanent magnet or electromagnet.

BACKGROUND ART

In general, a bearing is a core part in a rotor field, and oil or gas is injected therein to minimize mechanical friction during rotation.

In a conventional bearing, mechanical contacts inevitably occur, because a bearing shaft is rotated or a ball bearing is used and rotated. When such a bearing is used in a galvanizing line, the bearing may be gradually abraded while being rotated in a galvanizing bath in which the temperature ranges from 450° C. to 470° C. Furthermore, since the bearing may cause an unstable rotation, vibrations and noise may occur when a roll is rotated.

In particular, such vibrations may increase a coating weight variation, when a steel plate passes through an air knife which is a gas wiping device provided at the rear side thereof. Then, it may cause a defect in products.

Therefore, in order to prevent such a problem caused by the mechanical contact and abrasion, the roll shaft needs to be periodically replaced. For example, the roll shaft may be replaced every two or three weeks. However, as the equipment is increased in size and the line is increased in speed, the lifespan of the mechanical ball bearing may be rapidly shortened.

FIG. 1 illustrates a conventional hot-dip galvanizing device. In the conventional hot-dip galvanizing device illustrated in FIG. 1, a steel plate 6 passing through a galvanizing bath 1 passes through a sink roll 3, a stabilizing roll 5, and a correcting roll 4 and then passes through an air knife 2, an electromagnetic stabilizer 8, and a top roll 7. The temperature of the molten zinc in the galvanizing bath 1 ranges from 450 to 460° C., and steel plates 6 having a variety of widths and thicknesses may pass through the galvanizing bath.

A load applied to a roll shaft may differ depending on the steel plates 6 to be supplied. In the case of the sink roll 3, a maximum load of 500 kgf may be applied to both ends thereof. Furthermore, a load of ±100 kgf may act in the rotation direction of the roll due to a dynamic characteristic such as a vibration, and a maximum load of less than 100 kgf may act in the axial direction thereof.

In such a hot-dip galvanizing process, a constant force does not act at all times, because of various kinds of steels and tension. Therefore, when a high-strength steel or high-tensile steel is processed, a hot-dip galvanizing device is required, which exhibits a rapid response and a strong physical characteristic even though a force acting at both ends of a roll in a radial direction and a force acting in an axial direction are changed, and has a long lifespan because it may be used in a non-contact manner.

An object of the present invention is to provide a magnetic bearing device for supporting a roll shaft, in which the main factors having an effect upon the performance of an electromagnetic force are optimally designed depending on a result obtained by analyzing the characteristics of the magnetic bearing device.

Another object of the present invention is to provide a magnetic bearing device which controls a current applied for stable driving in order to remove vibrations in a roll and a steel plate.

Another object of the present invention is to provide a magnetic bearing device which reduces a coating weight variation when an air knife performs gas wiping and enables a roll shaft within a galvanizing bath to be used semi-permanently.

Another object of the present invention is to provide a magnetic bearing device which obtains a rapid response speed greater than that realized in the case that an existing proximity sensor is used, by using a magnetic bearing which does not used an expensive sensor.

SUMMARY OF THE INVENTION

According to an aspect of the present invention, there is provided a magnetic bearing device including: a magnet generating a magnetic field at a protrusion formed toward a roll shaft; and a body portion supporting the magnet in one direction. The roll shaft is supported while an air gap is formed between the roll shaft and the protrusion, and both sides of the protrusion are rounded.

The magnet may include an electromagnet, a permanent magnet, or a combination of the electromagnet and the permanent magnet, the magnetic field generated at the protrusion may support the roll shaft while forming the air gap between the roll shaft and the protrusion, the electromagnet may include a pole having a protrusion formed toward the roll shaft and a coil wound around the pole, and the permanent magnet may include a protrusion formed toward the roll shaft, the protrusion having a coil wound therearound.

The magnetic bearing device may further include an axial magnetic bearing formed at both ends of the roll shaft and supporting the roll shaft in a direction of the roll shaft when the roll shaft is rotated; and a magnetic bearing formed in a radial direction of the roll shaft and supporting the roll shaft in the radial direction of the roll shaft when the roll shaft is rotated.

When the magnet is an electromagnet, a direct current may be applied to the coil.

The direct current may be applied to the coil by a pulse width modulation (PWM) driver.

When the magnet is an electromagnet, the coil may be Y-connected.

When the magnet is an electromagnet, the air gap between the roll shaft and the pole may be controlled by the magnitude of a current applied to the coil.

The magnetic bearing device may be provided in a sink roll of a hot-dip galvanizing device, and an air gap between the pole and molten zinc surrounding a roll shaft of the sink roll may range from 0.2 mm to 1 mm.

The magnetic bearing device may be cooled by using nitrogen or air as a cooling gas.

The cooling gas may descend from above the magnetic bearing device to pass through the magnetic bearing device, and then ascend to above the magnetic bearing device.

The cooling gas may descend from above the magnetic bearing device to pass through the magnetic bearing device, and then descend to under the magnetic bearing device.

A housing provided outside the magnetic bearing device may include a non-magnetic material.

The rounded protrusion of the pole may have a circumferential length along the circumference of the roll shaft equal or less than that of the protrusion of the pole which is not rounded.

When the magnet is an electromagnet, an alternating current may be applied to the coil, and a radial levitation force of the roll shaft and a circumferential propulsive force of the roll shaft may be generated by a time varying magnetic field formed by the alternating current.

The roll shaft may be formed of a copper or aluminum conductor.

The magnetic bearing device may support a roll shaft of any one of a sink roll, a stabilizing roll, and a correcting roll which are provided in a hot-dip galvanizing device.

A body portion of the radial magnetic bearing may be integrated by connecting the pole in a circumferential direction of the roll shaft.

According to the embodiment of the present invention, the permanent magnets or electromagnets are used in order to support the roll shaft in a non-contact manner, and a mechanical contact does not occur. Therefore, noise by friction and an energy loss are small, and lubrication or sealing does not need to be performed. Accordingly, since the rotation speed of the roll shaft is allowed to a very high level, galvanized steel plates may be produced at a high speed.

Furthermore, since the stiffness and damping control of the bearing is performed by a gain, acceleration may be stably performed at a critical speed or more. Therefore, the number of replaced bearings significantly decreases.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Figure 1:
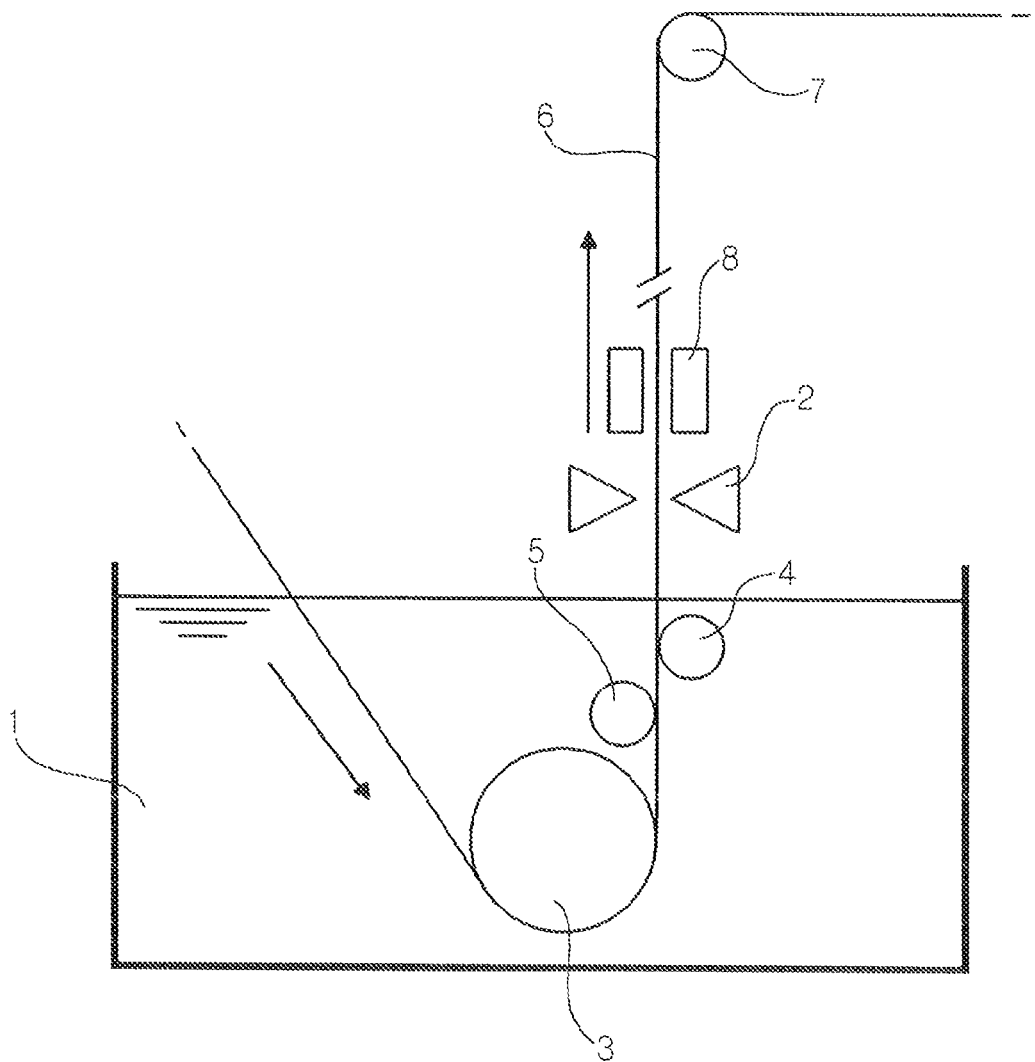
FIG. 1 is a schematic view of a conventional hot-dip galvanizing device.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the thicknesses of layers and regions are exaggerated for clarity. Like reference numerals in the drawings denote like elements, and thus their description will be omitted.

Figure 2:
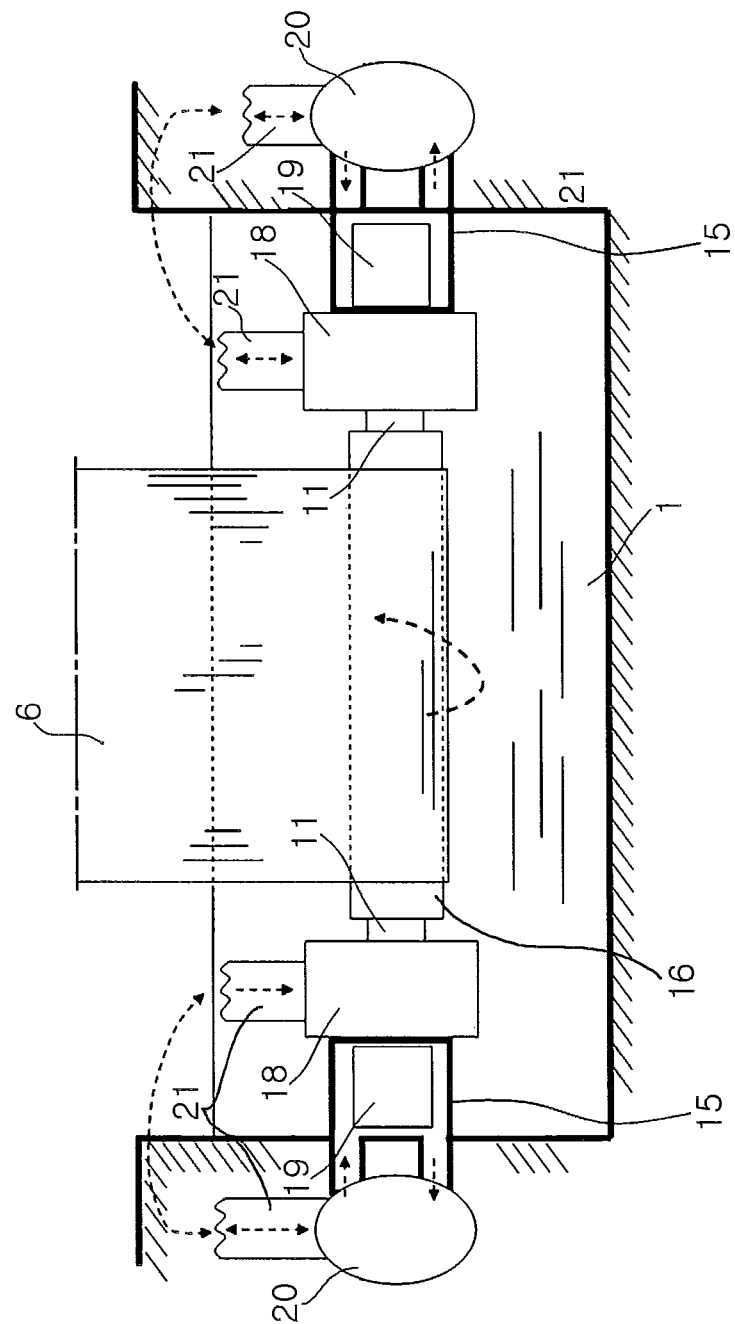
FIG. 2 is a diagram illustrating a state in which a steel plate passes through a roll in a hot-dip galvanizing device according to an embodiment of the present invention.

FIG. 2 is a diagram illustrating a state in which a steel plate passes through a roll in a hot-dip galvanizing device according to an embodiment of the present invention. Referring to FIG. 2, the hot-dip galvanizing device includes a galvanizing bath 1 filled with molten zinc, a roll 16 which is put into the galvanizing bath 1 and rotates about a roll shaft 11 in order to transfer a steel plate 6 put into the galvanizing bath 1, and a magnetic bearing having a magnet which generates a magnetic field at a protrusion formed toward the roll shaft 11. At this time, the magnetic bearing supports the roll shaft 11 while forming an air gap between the protrusion and the molten zinc surrounding the roll shaft 11. Such a magnetic bearing device may be used to support a roll shaft of a sink roll, a stabilizing roll, or a correcting roll of the hot-dip galvanizing device, and includes an axial magnetic bearing 19 and a radial magnetic bearing 18.

The radial magnetic bearing 18 serves to control an applied current having an effect upon an electromagnetic force to thereby minimize radial eccentricity when the roll shaft 11 rotates. The axial magnetic bearing 19 serves to minimize axial eccentricity, like the radial magnetic bearing 18.

The rotation speed of the roll 16 is less than 4 Hz, which speed is a limit of work line speed, and a vibration frequency corresponding to the rotation speed is less than 10 Hz. Without using the conventional ball bearing causing mechanical friction, a bias current having a rapid response is used to significantly reduce noise caused by vibration and friction, and a dynamic characteristic is checked to set an optimal response speed to perform a control.

A housing 15 is sealed in such a manner that the molten zinc does not penetrate into the axial magnetic bearing 19 and the radial magnetic bearing 18. Although the housing 15 is covered with the sealing film, the efficiency of the electromagnetic force may decrease when the internal temperature of the axial magnetic bearing 19 and the radial magnetic bearing 18 is high. Therefore, a cooling gas tank 20 and a pipe 21 are provided to perform internal heat purging. When it is assumed that the internal temperature of the cooling gas tank 20 and the pipe 21 is always maintained to 250° C. or less, the sealing function may prevent the molten zinc from penetrating into the magnetic bearing, even in the case that a power problem occurs during repair or driving.

As the temperature of the housing 15 decreases, zinc dross may occur in a region close to the housing 15. Therefore, a double casing is applied to the housing 15. When the temperature decreases, the performance of the magnetic bearing is maintained so as to reduce a variation in control amount. This may significantly reduce the vibration of the roll 16 in the radial direction. As a result, when the steel plate 6 is advanced, the generation of vibrations may be minimized so as to maintain a favorable condition during gas wiping. The housing provided outside the axial magnetic bearing or the radial magnetic bearing is formed of a non-magnetic material.

Figure 3:
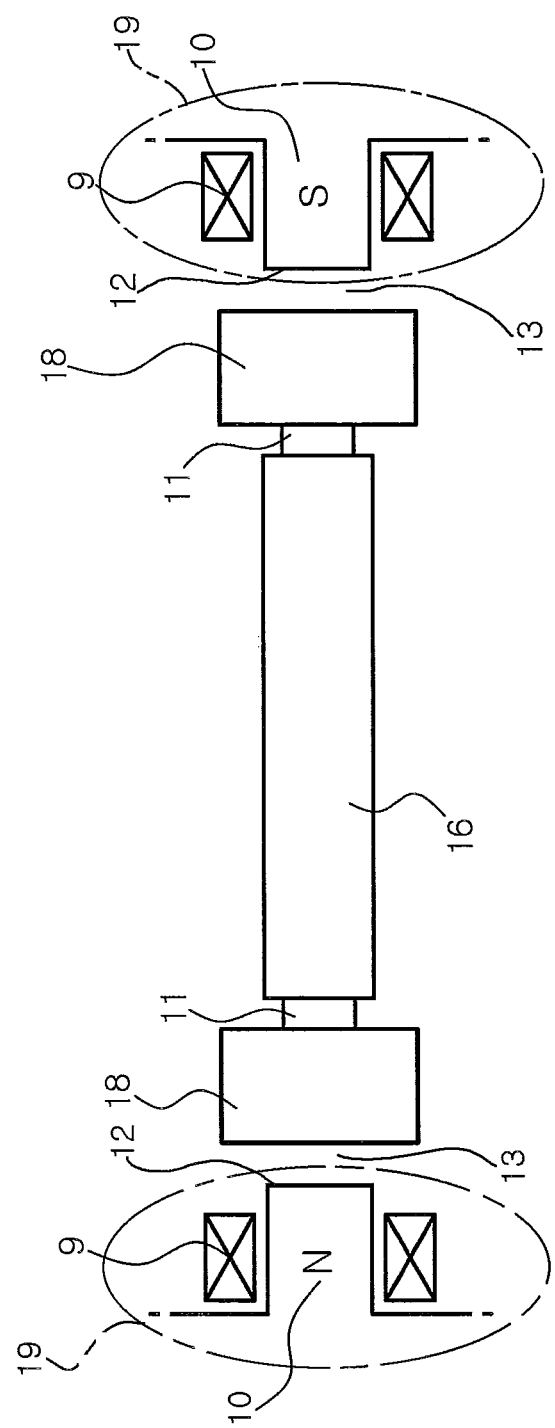
FIG. 3 is a diagram explaining the structure of an axial magnetic bearing according to the embodiment of the present invention.

FIG. 3 is a diagram explaining the structure of the axial magnetic bearing according to the embodiment of the present invention. As the axial magnetic bearing 19, at least one or more permanent magnets (around which a coil may be wound) or electromagnets are used.

Referring to FIG. 3, when the electromagnets are used, the axial magnetic bearing 19 includes a pole 10 having a protrusion 12 formed toward the roll shaft 11 and a coil 9 wound around the pole 10. An electromagnetic force generated by a magnetic field formed by passing a current into the coil 9 supports the roll shaft 11 while forming an air gap 13 between the protrusion 12 and the molten zinc surrounding the roll shaft 11. Specifically, the axial magnetic bearing 19 is formed at both ends of the roll shaft 11. When a steel plate passes on the surface of the roll 16 to rotate the roll shaft 11, the axial magnetic bearing 19 supports the roll shaft 11 in the direction of the roll shaft 11. At this time, the axial magnetic bearing 19 forms the air gap 13 with the roll shaft 11 at the both ends of the roll shaft 11 surrounded by the radial magnetic bearing 18 and the air gap 13.

When the permanent magnets are used, a magnetic field formed by the permanent magnets supports the roll shaft 11 while forming an air gap between the protrusion 12 and the molten zinc surrounding the roll shaft 11. This case may be understood on the basis of such a principle that the coil 9 is not wound around the pole 10 and the magnetic field is generated from the protrusion 12 to thereby support the roll shaft 11 in the direction of the roll shaft 11. Furthermore, the permanent magnets (around which a coil may be wound) and the electromagnets may be combined and used.

Figure 4:
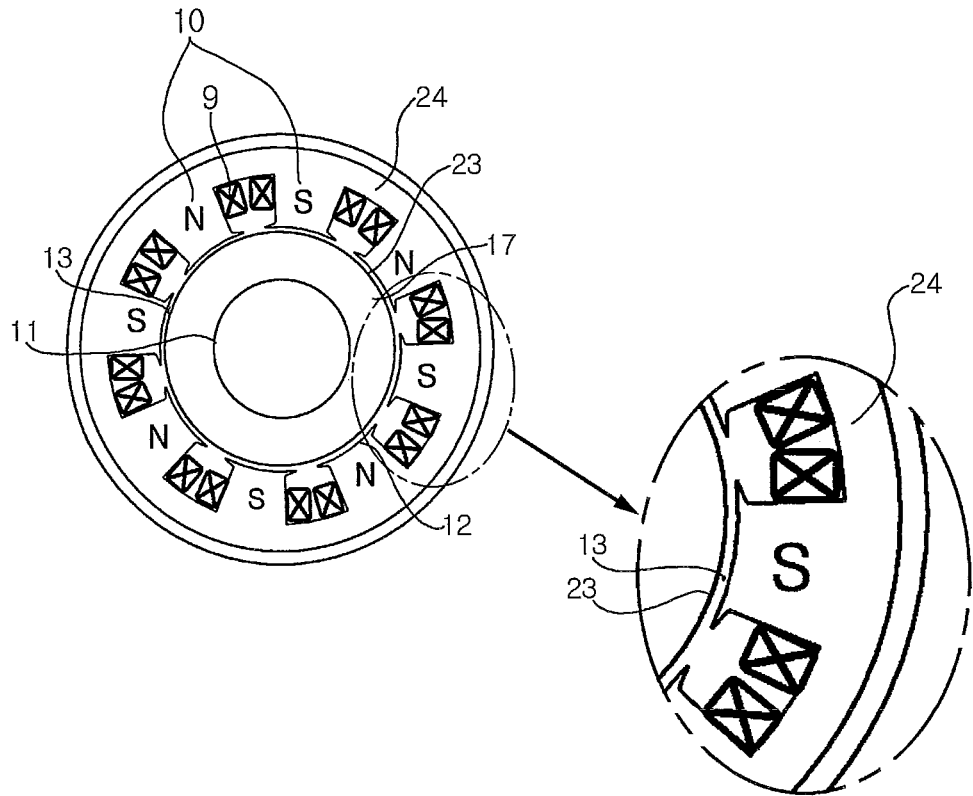
FIG. 4 is a diagram illustrating the internal structure of a radial magnetic bearing according to the embodiment of the present invention.
Figure 5:
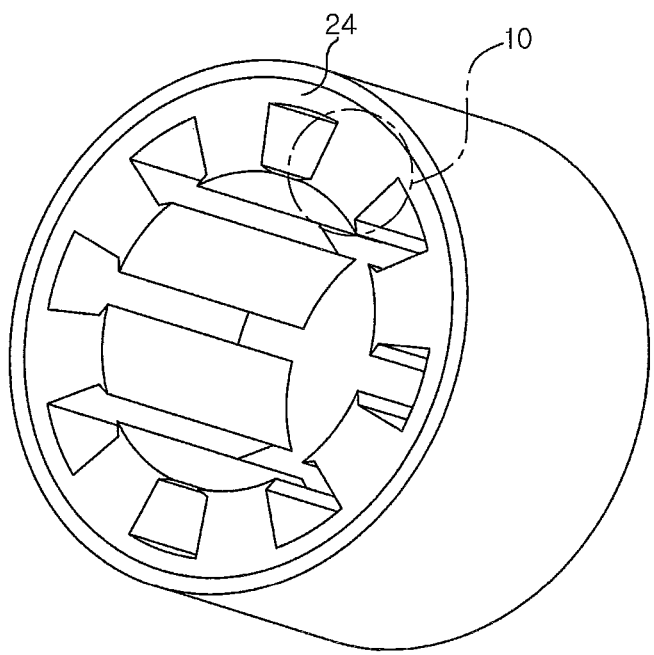
FIG. 5 is a perspective view of a body portion of the radial magnetic bearing according to the embodiment of the present invention.

FIG. 4 is a diagram illustrating the internal structure of the radial magnetic bearing according to the embodiment of the present invention. FIG. 5 is a perspective view of a body portion of the radial magnetic bearing according to the embodiment of the present invention. As the radial magnetic bearing, at least two or more permanent magnets (around which a coil may be wound) or electromagnets are used.

Referring to FIGS. 4 and 5, when the electromagnets are used, the radial magnetic bearing includes a pole 10 having a protrusion 12 formed toward the roll shaft 11, a coil 9 wound around the pole 10, and a body portion 24 integrated by connecting the poles 10 in the circumferential direction of the roll shaft 11. The body portion 24 supports an electromagnet formed by winding the coil 9 around the pole 10. In the axial magnetic bearing, the body portion 24 also serves to support an electromagnet. Even when the permanent magnets are used, the body portion 24 supports the permanent magnets.

An electromagnetic force generated by a magnetic field formed by passing a current into the coil 9 supports the roll shaft 11 while forming the air gap 13 between the protrusion 12 and the molten zinc surrounding the roll shaft 11. Specifically, the radial magnetic bearing is formed in the radial direction of the roll shaft 11, and supports the roll shaft 11 in the radial direction of the roll shaft 11 when the roll shaft 11 is rotated.

The nominal air gap 13 of which the value is not changed is filled with cooling gas. A sealing film 23 is formed at the boundary between the nominal air gap 13 and the molten zinc 17. The sealing film 23 is formed of ceramic or stainless steel as a non-magnetic material which is not affected by a magnetic force. The protrusion 12 of the pole 10 may be formed in various shapes to minimize an eddy current and increase an area in which the electromagnetic force comes into contact with the roll shaft 11.

In the radial magnetic bearing, the dynamic characteristic of the electromagnetic force line and the magnitude of the force are determined by the number of poles 10, the shape of the protrusion 12 of the pole 10, and the number of coil windings, and a bias current applied to the coil 9, and a control frequency.

In this embodiment of the present invention, the shape of the protrusion 12 of the pole 10 is designed in such a manner as illustrated in FIG. 4, in order to reduce magnetic flux leakage and increase a cross-sectional area in which the magnetic force is induced. The cross-sectional area of a region close to the pole 10 is reduced, and the cross-sectional area of a region close to the roll shaft 11 is maximized. Furthermore, the shape of the protrusion 12 should be changed depending on the number and area of poles 10, in order for a stable control. In this case, the air gap is controlled with higher precision than in a general magnetic bearing, which makes it possible to remove virtually all vibration in the roll shaft 11. Due to the shape of the roll shaft 11 and the characteristic of the galvanizing line, the tension of the steel plate is applied to the upper part at all times. When a load of the magnetic force is small and considerably small tension is applied, the pole of the magnetic force acting in the downward direction may be controlled more precisely. Since the pole 10 having the coil 9 wound therearound is not rotated, a bias current is applied in a direction away from the air gap 13 to control the magnetic force in real time.

The coil 9 is Y-connected, and a direct current is applied to the coil 9 by a pulse width modulation (PWM) driver. The air gap between the molten zinc 17 and the pole 10 is controlled depending on the magnitude of the current applied to the coil 9. The electromagnetic force is proportional to the number of poles 10, proportional to the square of the current applied to the coil 9, proportional to the square of the number of coil windings, inverse proportional to the square of the air gap 13, and proportional to the cross-sectional area of a circle formed inside by the protrusions 12 of the poles 10. In the case of the magnetic bearing provided in the sink roll of the hot-dip galvanizing device, the control range of the air gap 13 between the molten zinc 17 and the pole 10 may range from 0.2 mm to 1 mm, in order to generate a minimum electromagnetic force and support a minimum load of 500 kgf.

When the permanent magnets are used, the magnetic bearing is provided as the permanent magnets which generate a magnetic field at the protrusion formed toward the roll shaft, and supports the roll shaft while forming an air gap between the permanent magnets and the molten zinc surrounding the roll shaft. This case may be understood on the basis of such a principle that the coil 9 is not wound around the pole 10 and the pole 10 generates a magnetic field to support the roll shaft in the radial direction of the roll shaft. Furthermore, the permanent magnets (around which a coil may be wound) and the electromagnets may be combined and used.

According to the embodiment of the present invention, the permanent magnets may be used in the axial magnetic bearing and the radial magnetic bearing. However, the electromagnets capable of applying a force in a variable manner may be used in consideration of the galvanizing environment in the hot-dip galvanizing line, and the number of poles 10 may be set to be two or more. Furthermore, a Halbach array generating a magnetic field with a large intensity is used to increase the interval between the poles 10. In particular, a passive magnetic bearing using permanent magnets is used in a galvanizing line in which the tension and the kind of steel are not changed, and the permanent magnets (around which a coil may be wound) and the electromagnets may be combined and used.

The axial magnetic bearing and the radial magnetic bearing according to the embodiment of the present invention are implemented in an electromagnetic suspension type which applies a direct current, and the axial magnetic bearing controls the electromagnetic force in real time to maintain the force balance of the roll in a work side and a drive side and to prevent a serpentine motion in the steel plate. When the roll shaft 11 is formed of a copper or aluminum conductor, the axial magnetic bearing and the radial magnetic bearing are implemented as a repulsive type which applies an alternating current to the coils of the axial magnetic bearing and the radial magnetic bearing and simultaneously generates a radial levitation force of the roll shaft and a circumferential propulsive force of the roll shaft by a time varying magnetic field formed by the alternating current.

Figure 6:
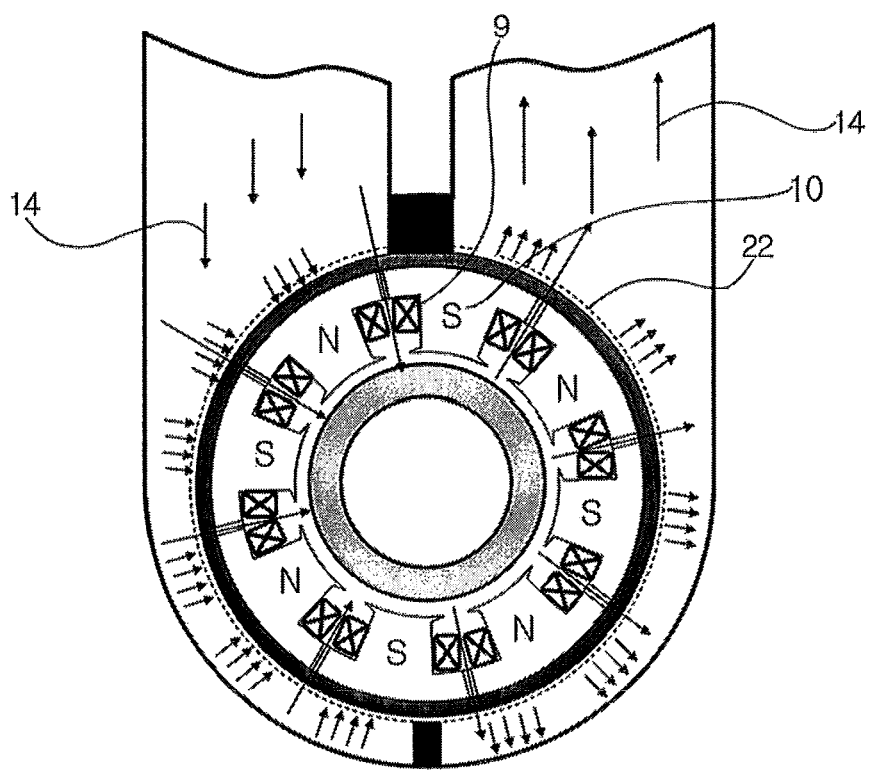
FIG. 6 is a diagram illustrating an example of the internal structure of the radial magnetic bearing device according to the embodiment of the present invention.

FIG. 6 is a diagram illustrating an example of the internal structure of the radial magnetic bearing device according to the embodiment of the present invention. Supplied cooling gas 14 penetrates through a mesh screen 22 to the sealing film in a state in which foreign objects are removed by the mesh screen 22. Circulation of the cooling gas 14 is performed in a U-shaped manner in which the cooling gas 14 descends from above the magnetic bearing to pass through the magnetic bearing, and then ascends to above the magnetic bearing.

In order to prevent an efficiency reduction in the magnetic bearing and avoid the Cuire temperature at which the magnetic force is neutralized, nitrogen gas is used as the cooling gas. The nitrogen gas is circulated so as to perform cooling. The temperature of the electromagnet formed by winding the coil 9 around the pole 10 is decreased to 250° C. or less, such that control may be stably performed after the nitrogen gas passes around the coil 9. Since an ambient temperature has a direct effect upon the efficiency of the magnetic bearing, the ambient temperature is set to a temperature close to the normal temperature. Since the nitrogen gas starts to descend from above, the structure of FIG. 6 is stable for supporting a pressure when the high-pressure cooling gas 14 is supplied.

Figure 7:
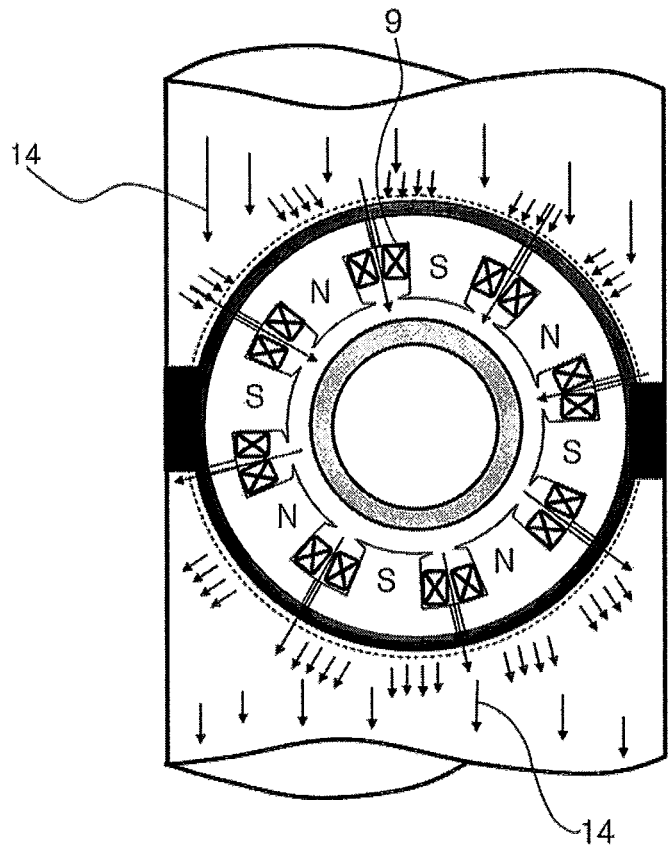
FIG. 7 is a diagram illustrating another example of the internal structure of the radial magnetic bearing device according to the embodiment of the present invention.

FIG. 7 is a diagram illustrating another example of the internal structure of the radial magnetic bearing device according to the embodiment of the present invention. The structure of FIG. 7 has the same principle as that of FIG. 6, but the circulation of the cooling gas 14 is performed in such a manner that the cooling gas 14 descends from above the magnetic bearing to pass through the magnetic bearing and then moves to under the magnetic bearing. The magnetic bearing is supported in a horizontal direction. Therefore, when the high-pressure cooling gas 14 is jetted, the structure is unstable. When the magnetic bearing is reduced in weight, the structure of FIG. 4, in which the circulation path is short and the area limitation is small, is applied.

Figure 8:
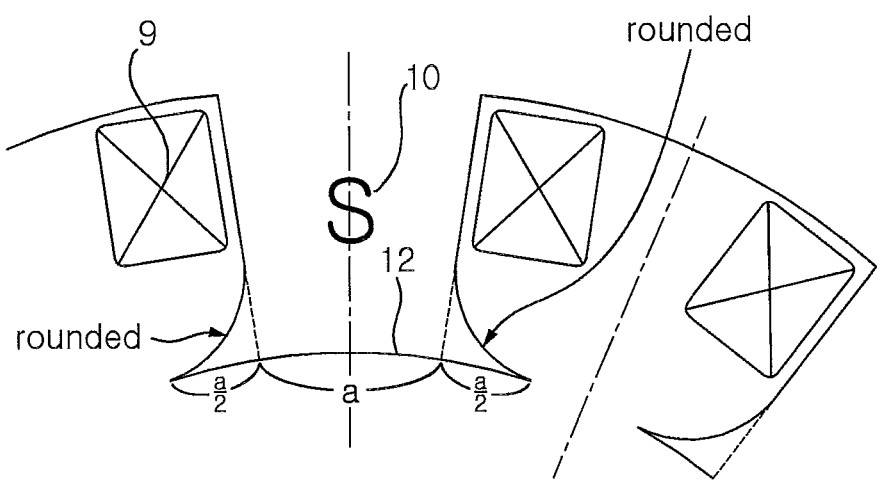
FIG. 8 is an expanded view of a rounded protrusion of a pole according to the embodiment of the present invention.

FIG. 8 is an expanded view of the rounded protrusion of the pole. Referring to FIG. 8, both sides of the protrusion 12 of the pole 10 are rounded so as to be symmetrical with each other. When both sides of the protrusion 12 of the pole 10 are rounded, an eddy current leaking from the protrusion 12 may be minimized, and a contact area of the magnetic force applied to the roll shaft may be maximized.

The rounded protrusion 12 of the pole 10 has a circumferential length two times larger than that of the protrusion 12 of the pole 10 which is not rounded. In FIG. 8, the rounded protrusion 12 of the pole 12 has a circumferential length of 2a (=a/2+a+a/2), while the protrusion 12 of the pole 12 which is not rounded has a circumferential length of a. When the end of the protrusion 12 of the pole 10 is rounded in such a manner, the electromagnetic force generated by the adjacent coil 9 is prevented from being affected.

Figure 9:
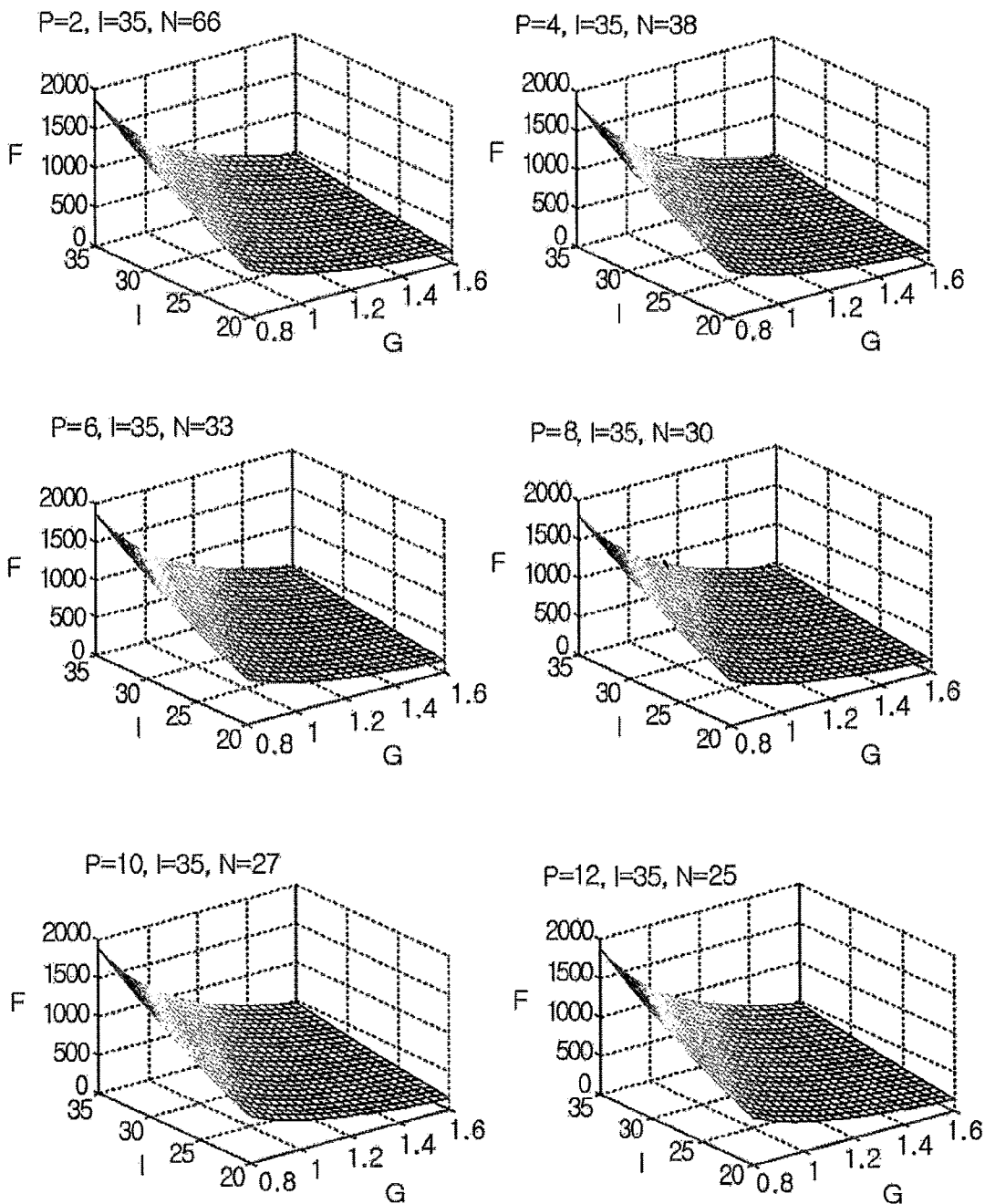
FIG. 9 is a performance curve diagram of the radial magnetic bearing according to the embodiment of the present invention.

FIG. 9 is a performance curve diagram of the radial magnetic bearing according to the embodiment of the present invention. FIG. 9 shows the performance of the radial magnetic bearing depending on the number P of poles, a current I applied to the coil, and the number N of coil windings.

The radial magnetic bearing is set to withstand a load F of 500 kgf (actual field conditions) in a region where the air gap ranges from 1.2 mm to 1.4 mm. DC power is used as the current, and G represents the nominal air gap.

The magnetic bearing may be driven to generate torque, or may be passively rotated. The magnetic bearing serves to maintain the air gap in the radial direction. The roll is passively rotated by the advance of the steel plate at all times.

Figure 10:
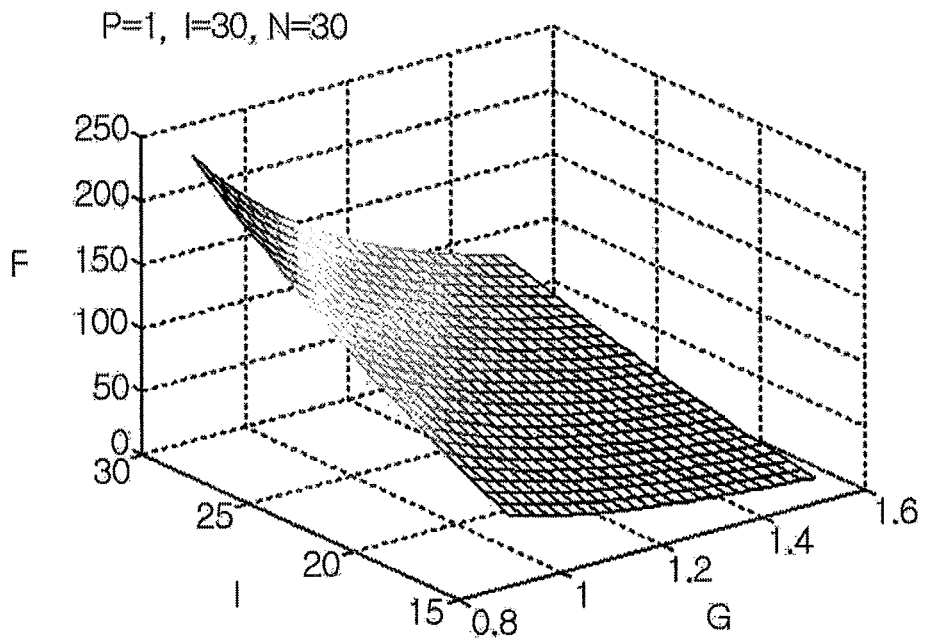
FIG. 10 is a performance curve diagram of the axial magnetic bearing according to the embodiment of the present invention.

FIG. 10 is a performance curve diagram of the axial magnetic bearing according to the embodiment of the present invention. When the number P of poles is set to 1, a current I applied to the coil is set to 30, and the number N of coil windings is set to 30, the axial magnetic bearing withstands a load F of 100 kgf (actual field condition) in a region where the air gap ranges from 1 mm to 1.2 mm. DC power is used as the current, and G represents a normal air gap. The axial magnetic bearing serves to maintain the air gap in the axial direction, and support the roll shaft in the axial direction. Therefore, one pole is used.

Figure 11:
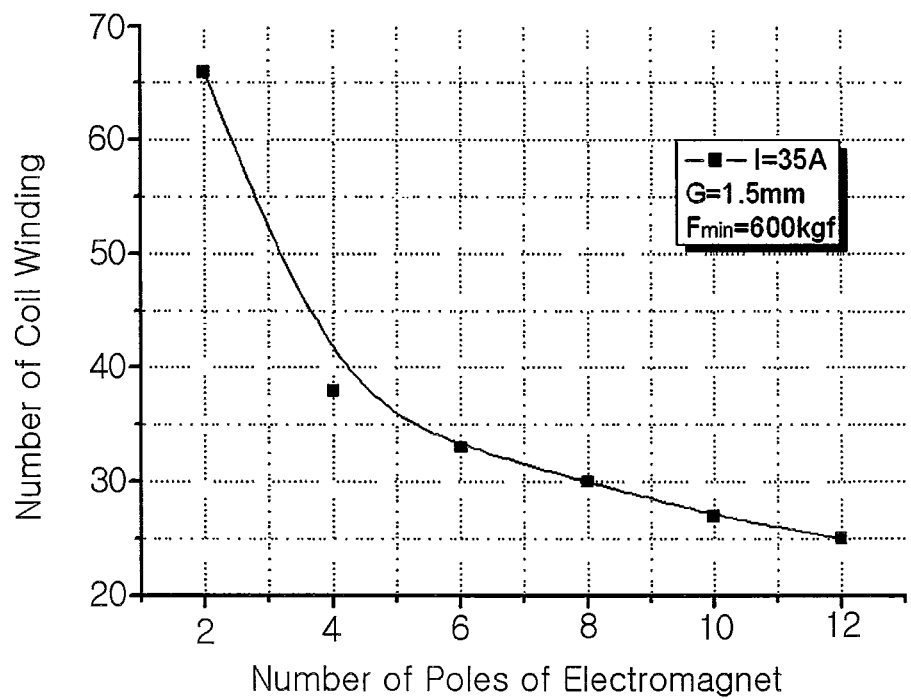
FIG. 11 is a curve diagram showing the relationship between the number of coil windings and the number of poles.

FIG. 11 is a curve diagram showing the relationship between the number of coil windings and the number of poles of the electromagnet. FIG. 11 shows a sensitivity curve depending on the number of poles and the number of coil windings in the radial magnetic bearing in which a current of 35 A is applied to the coil and the air gap is 1.5 mm, in order to support a minimum load $F_{min}$ of 600 kgf. The size of the magnetic bearing is not limited. The number of required coil windings is calculated while changing the number of poles from two to 12 in a state in which the current applied to the coil is fixed.

While the present invention has been shown and described in connection with the exemplary embodiments, it will be apparent to those skilled in the art that modifications and variations can be made without departing from the spirit and scope of the invention as defined by the appended claims.

The invention claimed is:

1. A magnetic bearing device comprising:
    a magnet supporting a roll shaft while an air gap is formed between the roll shaft and a protrusion by generating a magnetic field at the protrusion formed toward the roll shaft; and
    a body portion supporting the magnet in one direction,
    wherein the magnet comprises an electromagnet,
    an alternating current is applied to the electromagnet, and a radial levitation force of the roll shaft and a circumferential propulsive force of the roll shaft are generated by a time varying magnetic field formed by the alternating current.

2. The magnetic bearing device of claim 1, wherein the magnet comprises a permanent magnet, the magnetic field generated at the protrusion supports the roll shaft while forming the air gap between the roll shaft and the protrusion, the electromagnet comprises a pole having a protrusion formed toward the roll shaft and the alternating current is applied to a coil wound around the pole, and the permanent magnet comprises a protrusion formed toward the roll shaft, the protrusion having a coil wound therearound.

3. The magnetic bearing device of claim 1, further comprising:
    an axial magnetic bearing formed at both ends of the roll shaft and supporting the roll shaft in a direction of the roll shaft when the roll shaft is rotated; and
    a magnetic bearing formed in a radial direction of the roll shaft and supporting the roll shaft in the radial direction of the roll shaft when the roll shaft is rotated.

4. The magnetic bearing device of claim 1 wherein both sides of the protrusion are rounded.

5. The magnetic bearing device of claim 2, wherein when the magnet is an electromagnet, the coil is Y-connected.

6. The magnetic bearing device of claim 2, wherein when the magnet is an electromagnet, the air gap between the roll shaft and the pole is controlled by the magnitude of a current applied to the coil.

7. The magnetic bearing device of claim 6, wherein the magnetic bearing device is provided in a sink roll of a hot-dip galvanizing device, and an air gap between the pole and molten zinc surrounding a roll shaft of the sink roll ranges from 0.2 mm to 1 mm.

8. The magnetic bearing device of claim 1, wherein the magnetic bearing device is cooled by using nitrogen or air as a cooling gas.

9. The magnetic bearing device of claim 8, wherein the cooling gas descends from above the magnetic bearing device to pass through the magnetic bearing device, and then ascends to above the magnetic bearing device.

10. The magnetic bearing device of claim 8, wherein the cooling gas descends from above the magnetic bearing device to pass through the magnetic bearing device, and then descends to under the magnetic bearing device.

11. The magnetic bearing device of claim 1, wherein a housing provided outside the magnetic bearing device comprises a non-magnetic material.

12. The magnetic bearing device of claim 4, wherein the rounded protrusion of the pole has a circumferential length equal of less than that of the protrusion of the pole which is not rounded.

13. The magnetic bearing device of claim 1, wherein the roll shaft is formed of a copper or aluminum conductor.

14. The magnetic bearing device of claim 1, wherein the magnetic bearing device supports a roll shaft of any one of a sink roll, a stabilizing roll, and a correcting roll which are provided in a hot-dip galvanizing device.

15. The magnetic bearing device of claim 3, wherein the magnet comprises a pole having a protrusion formed toward the roll shaft, and a body portion of the radial magnetic bearing is integrated by connecting the pole in a circumferential direction of the roll shaft.

* * * * *

UNITED STATES PATENT AND TRADEMARK OFFICE
CERTIFICATE OF CORRECTION

PATENT NO. : 8,476,797 B2  
APPLICATION NO. : 12/920691  
DATED : July 2, 2013  
INVENTOR(S) : Tae-In Jang et al.

Page 1 of 1

It is certified that error appears in the above-identified patent and that said Letters Patent is hereby corrected as shown below:

Title page, Column 2, Foreign Patent Documents, Line 4, delete "205260" and insert -- 2000205260 --

In the Claims

Column 10, Line 6, Claim 12, delete "of less" and insert -- or less --

Signed and Sealed this
Twenty-sixth Day of November, 2013

Margaret A. Focarino
*Commissioner for Patents of the United States Patent and Trademark Office*